(12) United States Patent
Mucke

(10) Patent No.: US 7,054,287 B2
(45) Date of Patent: May 30, 2006

(54) DATA TRANSMISSION IN A COMMUNICATION SYSTEM

(75) Inventor: Lars H. Mucke, San Diego, CA (US)

(73) Assignee: Staccato Communications, Inc., San Diego, CA (US)

( * ) Notice: Subject to any disclaimer, the term of this patent is extended or adjusted under 35 U.S.C. 154(b) by 0 days.

(21) Appl. No.: 10/888,341

(22) Filed: Jul. 8, 2004

(65) Prior Publication Data

US 2005/0030927 A1    Feb. 10, 2005

Related U.S. Application Data

(60) Provisional application No. 60/486,052, filed on Jul. 10, 2003.

(51) Int. Cl.
*H04J 3/00* (2006.01)
(52) U.S. Cl. ........................ 370/329; 370/345
(58) Field of Classification Search ............... 370/329, 370/330, 336, 345
See application file for complete search history.

(56) References Cited

U.S. PATENT DOCUMENTS 6,754,499 B1 *  6/2004  Smith .................... 455/450

6,788,702 B1    9/2004  Garcia-Luna-Aceves et al.
2003/0036350 A1  2/2003  Jonsson et al.

\* cited by examiner

*Primary Examiner*—Melvin Marcelo
(74) *Attorney, Agent, or Firm*—Van Pelt, Yi & James LLP

(57) ABSTRACT

A method of transmitting information comprises grouping a plurality of active time slots into a plurality of sub-frames wherein each of the sub-frames includes a plurality of contiguous active time slots, transmitting data during a first one of the plurality of sub-frames, waiting during an inactive period and transmitting data during a second one of the plurality of sub-frames. A system configured to transmit information, comprises a controller configured to group a plurality of active time slots into a plurality of sub-frames wherein each of the sub-frames includes a plurality of contiguous active time slots, and a transmitter coupled to the controller, configured to transmit data during a first one of the plurality of sub-frames, wait during an inactive period and transmit data during a second one of the plurality of sub-frames. A method of configuring a transmitter to transmit information comprises determining a piconet in which the transmitter operates, determining a transmission scheme according to the piconet and transmitting data according to the transmission scheme.

16 Claims, 6 Drawing Sheets

DATA TRANSMISSION IN A COMMUNICATION SYSTEM

CROSS REFERENCE TO RELATED APPLICATIONS

This application claims priority to U.S. Provisional Patent Application No. 60/486,052 entitled DUTY CYCLE REDUCTION SCHEME FOR MULTIBAND TRANSMISSION filed Jul. 10, 2003, which is incorporated herein by reference for all purposes.

FIELD OF THE INVENTION

The present invention relates generally to communication systems. More specifically, a wireless communication system is disclosed.

BACKGROUND OF THE INVENTION

In many communication systems, data packages are transmitted sequentially. The hop timing (i.e. the time delta between two packages) is usually fixed. Some systems use the same carrier frequency for transmitting all data packages and some systems employ frequency hopping, where the frequency used for transmitting one package, the frequency used for transmitting the immediately preceding package and the frequency used for transmitting the immediately following package are different. FIG. 1A is a diagram illustrating a transmission scheme. This scheme may be implemented by systems such as Ultra-Wideband (UWB) systems developed based on Multi-Band Orthogonal Frequency Division Multiplexing Alliance's (MBOA) 802.15.3a standard. Transmission of the data symbols is shown along the time axis and the frequency axis. In this example, symbols 100, 102 and 104 occupy substantially non-overlapping frequency bands Fa, Fb and Fc respectively. In FIG. 1A, data symbols transmitted at different frequencies are shown to be transmitted in their respective time slots. The transmission frequency pattern is then repeated.

FIG. 1B is another diagram illustrating the transmission scheme shown in FIG. 1A. For the purpose of illustration, transmission of the data packages is shown along the time axis while the frequency axis is omitted. Time slots such as 100, 102 and 104 are represented using blocks with frequency labels Fa, Fb and Fc, respectively. In the example shown, all the time slots are in use and data symbols are transmitted at full symbol rate.

Sometimes it may be useful to transmit the data symbols at a lower rate so that parts of the transmitter may be turned off or disabled when no data is transmitted in order to conserve power. FIG. 1C is a diagram illustrating a half rate transmission scheme. In the diagram shown, data packages are transmitted during every other time slot. FIG. 1D is a diagram illustrating a transmission scheme in which data is transmitted at one third of the full rate. In this scheme, data packages are transmitted during one out of three consecutive time slots and the rest of the time slots are inactive. The proposed schemes such as the ones shown in FIGS. 1C and 1D typically requires the radio to be turned on and off very rapidly. For example, in the MBOA 802.15.3a standard, each time slots is 312.5 nanoseconds in length. Because the radio can stay off for only one or two time slots, and because the radio components commonly require longer settling time, it is often challenging to implement a transmitter that can switch on and off within the allotted time. It would be desirable to have a way to allow reduced transmission rate and receive the benefits associated with a lower transmission rate, without imposing further limitations on the transmitter design.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique for transmitting information in wireless communication systems is disclosed. The technique is applicable for transmitting information at less than full rate. As used herein, the time period during which a data package (such as a predetermined number of data symbols or other appropriate data unit(s)) is transmitted is referred to as a time slot. A time slot during which data is transmitted is referred to as an active time slot, and a time slot during which no data is transmitted is referred to as an inactive time slot. The length of a time slot depends on the particular system and/or standard. The lengths of an active time slot and an inactive time slot may be the same or different.

In some frequency hopping systems, data transmitted during an active time slot is transmitted within a single frequency band that is substantially non-overlapping with respect to an adjacent frequency band used to transmit data during an adjacent active time slot. In some embodiments, active time slots are grouped into sub-frames that each includes a number of contiguous active time slots. Transmission of data in sub-frames may be separated by inactive periods each comprising a plurality of inactive time slots. Multiple sub-frames may also be grouped and transmitted together. Components of the transmitter may be turned off during the inactive time slots to conserve power. Transmission power during the active time slots may be increased accordingly without exceeding overall power limitation.

Figure 1A:
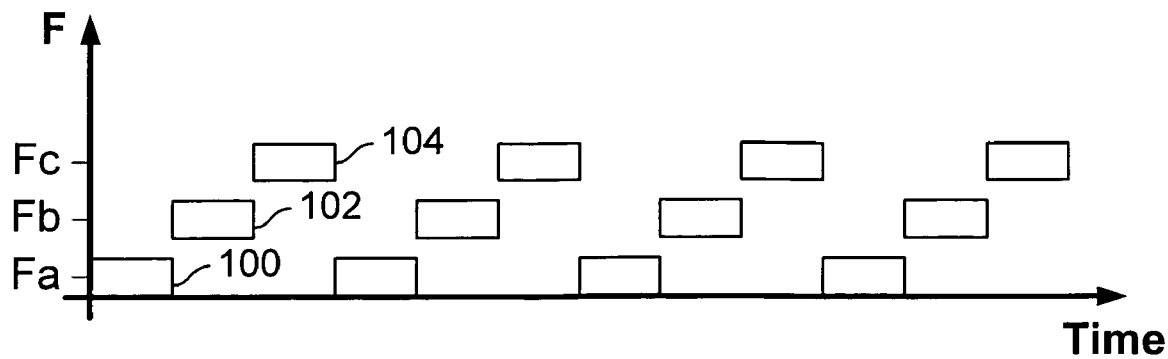
FIG. 1A is a diagram illustrating a transmission scheme.
Figure 1B:
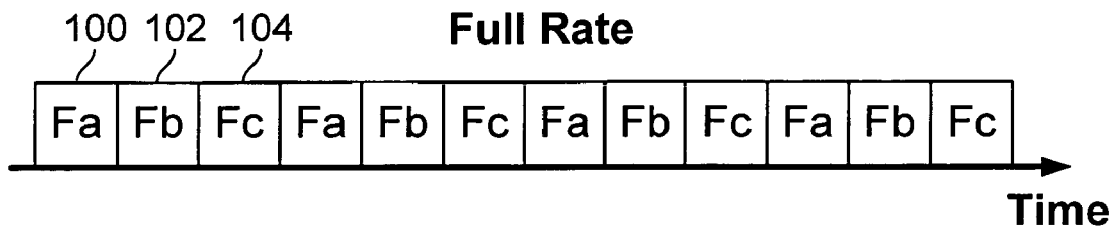
FIG. 1B is another diagram illustrating the transmission scheme shown in FIG. 1A.
Figure 1C:
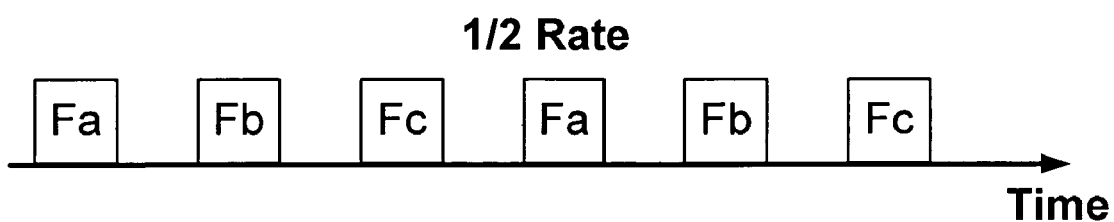
FIG. 1C is a diagram illustrating a ½ rate transmission scheme.
Figure 1D:
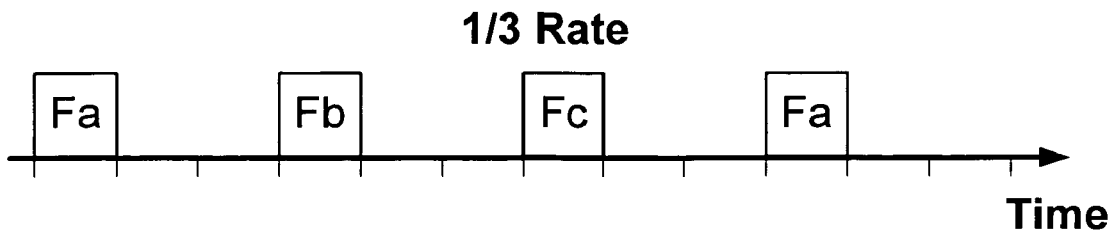
FIG. 1D is a diagram illustrating a transmission scheme in which data is transmitted at ⅓ of the full rate.
Figure 2:
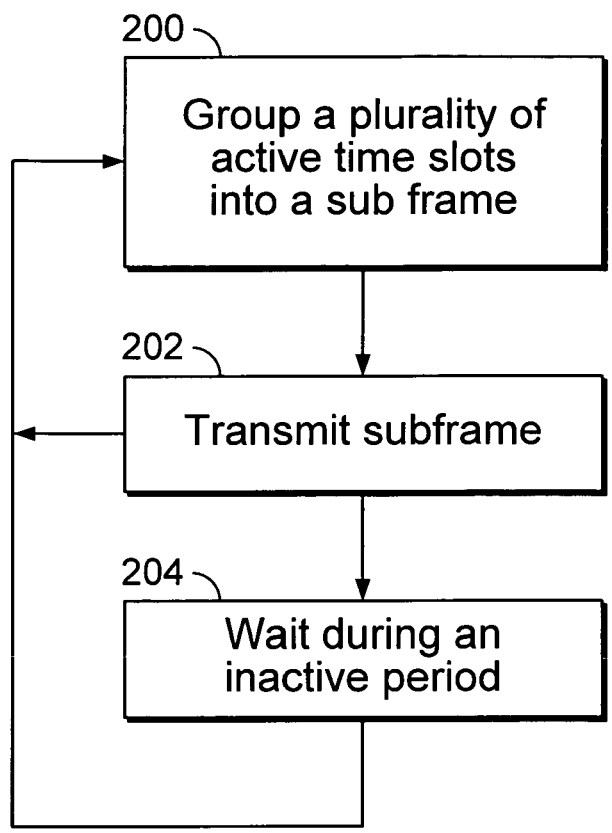
FIG. 2 is a flowchart illustrating a transmission scheme according to some embodiments.

FIG. 2 is a flowchart illustrating a transmission scheme according to some embodiments. According to this example, data symbols are transmitted at a rate lower than the full symbol transmission rate that the transmitter is capable of. In some embodiments, power is conserved by transmitting signals during active time slots and deactivating some radio components during inactive time slots. In some embodiments, some radio components are turned off during inactive time slots and more power is transmitted during the active time slots to maintain approximately the same average power level as full rate transmission. Higher transmission power typically allows for reduced data encoding overhead, thus the system can still transmit data close to its full data rate even though the symbol rate may be less than the full rate. Alternatively the increased transmit power can be used to increase the range of the transmitter. Lower symbol transmission rate may also help reduce symbol collision with adjacent systems. For example, transceivers operating in neighboring piconets in a UWB environment may adopt different transmission schemes that transmit data at substantially different times.

In this example, several active time slots are grouped into a sub-frame (200). It is preferable for these active time slots to be contiguous. Data is transmitted during this sub-frame (202). After waiting during an inactive period where no data is transmitted (204), another set of active time slots are grouped into a sub-frame (200) and symbol data is transmitted during the sub-frame (202). The transmitter does not necessarily enter an inactive period as soon as the transmission of a sub-frame has completed. Sometimes more than one set of active time slots may be grouped into sub-frames and transmitted one after another before an inactive period starts. The number of active time slots in the sub-frame depends on implementation. For the purpose of illustration, examples showing three active time slots per sub-frame are used throughout this specification, although other numbers are possible. The lengths of the inactive time periods also depend on implementation and may vary for different embodiments.

For purposes of illustration, examples of transmission schemes for frequency hopping systems that transmit adjacent data packages using different frequency bands are discussed in detail in the following specification, although grouping active time slots into sub-frames for transmission is also applicable for non-frequency hopping systems (such as certain UWB-OFDM systems operating in non-frequency hopping mode), where the time slots/sub-frames are transmitted using the same frequency band.

Figure 3A:
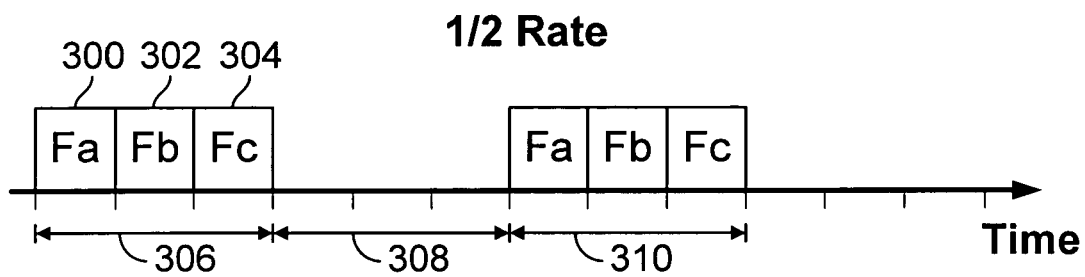
FIG. 3A is a diagram illustrating a transmission scheme according to some embodiments.

FIG. 3A is a diagram illustrating a transmission scheme according to some embodiments. In this example, symbols are transmitted at approximately ½ of the full rate. The symbols being transmitted are multi-band Orthogonal Frequency Division Multiplexing (OFDM) modulated symbols and the transmitter complies with the 802.15.3a standard. Three contiguous active time slots 300, 302 and 304 transmit within frequency bands Fa, Fb and Fc, respectively. Each time slot lasts approximately 312.5 nanoseconds. The active time slots are grouped to form sub-frame 306. An inactive period 308 that includes three contiguous inactive time slots follows. The pattern is then repeated and another sub-frame 310 is transmitted. Allowing extended inactive periods makes it possible to disable and enable certain components that have settling time that is greater than a time slot.

Figure 3B:
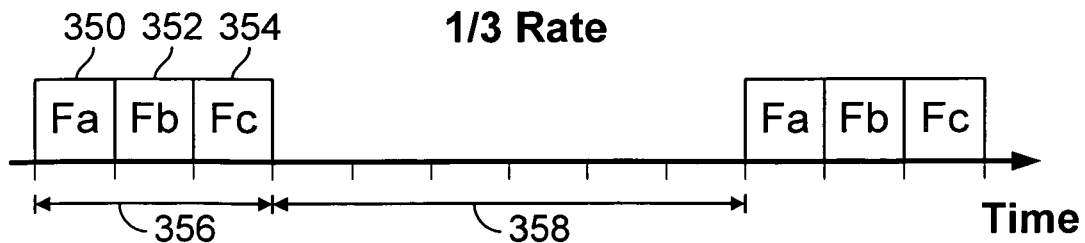
FIG. 3B is a diagram illustrating another transmission scheme according to some embodiments.

FIG. 3B is a diagram illustrating a transmission scheme according to some embodiments. In this example, symbols are transmitted at approximately ⅓ of the full rate. Three contiguous active time slots 350, 352 and 354 are grouped to form sub-frame 356. Inactive period 358 occupies twice as much time as the sub-frame, with six contiguous inactive time slots. The transmission is then repeated after the inactive period. By grouping multiple active time slots into a sub-frame, the inactive period is extended, allowing circuit components more time to settle during switching. Thus, a greater number of circuit components may be deactivated when not in use. Although the lengths of inactive time periods in the examples shown are integer multiples of the length of a sub-frame, other lengths may be used in other embodiments.

Figure 4A:
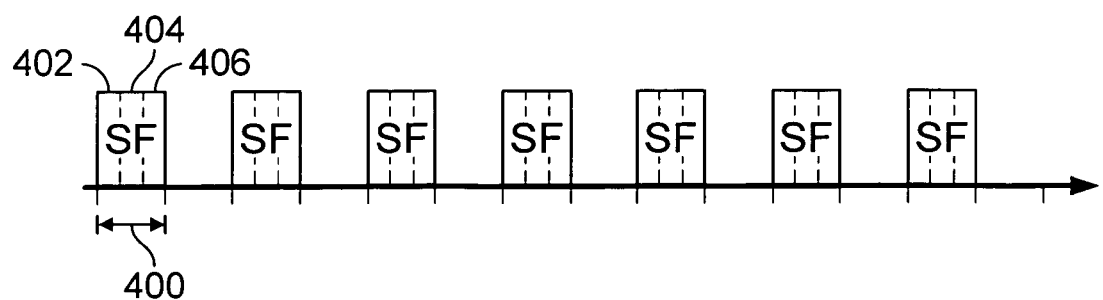
FIG. 4A is a diagram illustrating a transmission scheme similar to the one shown in FIG. 3B.

FIG. 4A is a diagram illustrating a transmission scheme similar to the one shown in FIG. 3B. In this example, data is transmitted at approximately ½ of the full rate. The transmitter transmits a sub-frame such as sub-frame 400, which includes three active slots (402, 404 and 406), waits for three inactive slots, then transmits the next sub-frame and waits again.

Figure 4B:
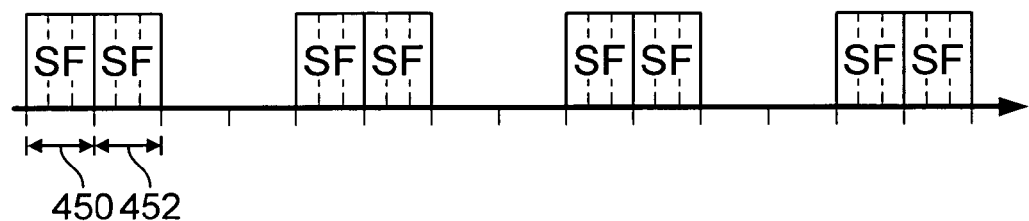
FIG. 4B is a diagram illustrating another approximately ½ rate transmission scheme.

FIG. 4B is a diagram illustrating another approximately ½ rate transmission scheme. In this example, two sub-frames (such as 450 and 452) are grouped together and transmitted sequentially. After six inactive slots, two more sub-frames are transmitted sequentially. Previously, it would be impractical to switch off certain components (such as voltage controlled oscillator (VCO)) during a short inactive time slot because the components typically require a long period to settle. By grouping the sub-frames and extending the inactive periods, the circuit components have a longer time interval to turn off and on, thus more parts of the system may be disabled during the inactive time slots to conserve power.

Figure 4C:
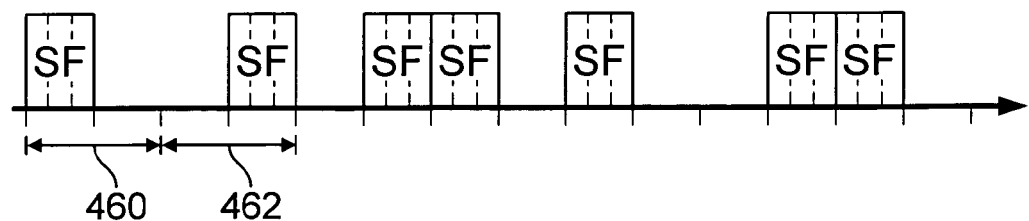
FIG. 4C is a diagram illustrating a randomized transmission scheme at approximately ½ rate according to some embodiments.

The transmission of the sub-frames may be randomized to reduce interference among multiple uncoordinated, co-located piconets. FIG. 4C is a diagram illustrating a randomized transmission scheme at approximately ½ rate according to some embodiments. In this example, transmission time is organized into super slots such as 460 and 462, where each super slot includes six time slots. To achieve ½ rate transmission, one sub-frame is transmitted during a super slot. Different super slot organization is used in some embodiments. For example, a super slot may include twelve regular time slots and two sub-frames are transmitted during each super slot.

In this case it is preferable to arrange the transmission of the sub-frames such that any two sequential sub-frames are separated by zero, three or six inactive time slots. Other arrangements are used in different embodiments. In some embodiments, location of the first active time slot where the transmission of a sub-frame commences is determined by a pseudorandom sequence or other appropriate predefined sequence. Since the locations of the active/inactive time slots are known to the system in advance. Circuit components may be selectively disabled and enabled based on the time slot locations. Certain components that require a longer settling time may be kept enabled during shorter inactive time slots and be disabled during longer inactive time slots.

Figure 5A:
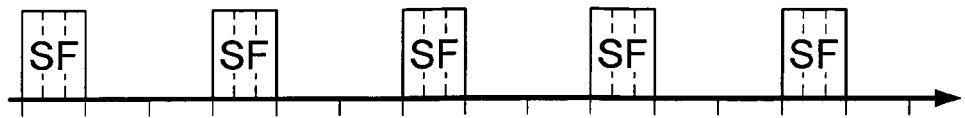
FIG. 5A is a diagram illustrating a transmission scheme for transmitting data at approximately ⅓ of the full rate, according to some embodiments.
Figure 5B:
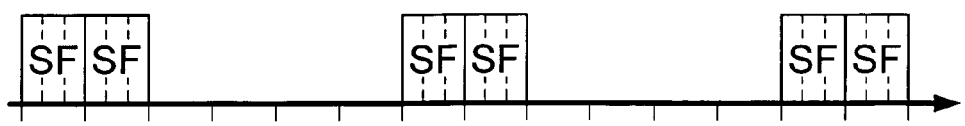
FIG. 5B is a diagram illustrating another transmission scheme for transmitting data at approximately ⅓ of the full rate, according to some embodiments.
Figure 5C:
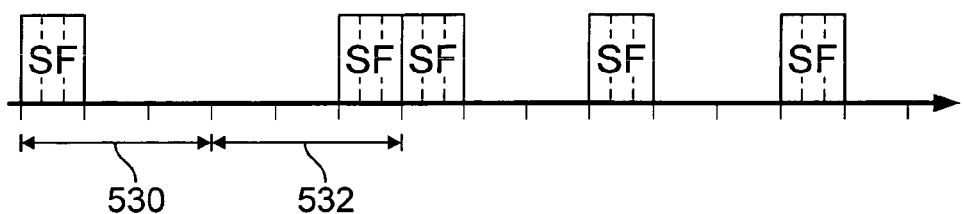
FIG. 5C is a diagram illustrating another transmission scheme for transmitting data at approximately ⅓ of the full rate, according to some embodiments.

FIG. 5A is a diagram illustrating a transmission scheme for transmitting data at approximately ⅓ of the full rate, according to some embodiments. In this example, the transmission scheme is a repetitive pattern of one sub-frame followed by six inactive time slots. FIG. 5B is a diagram illustrating another transmission scheme for transmitting data at approximately ⅓ of the full rate, according to some embodiments. In this example, two sub-frames are grouped together and transmitted sequentially. Two more sub-frames are transmitted after twelve inactive time periods. FIG. 5C is a diagram illustrating another transmission scheme for transmitting data at approximately ⅓ of the full rate, according to some embodiments. In this example, the transmission time is organized into super slots such as 530 and 532, where each super slot includes nine time slots. A sub-frame is transmitted per super slot. In the embodiment shown, the sub-frame is transmitted at the beginning or the end of the super slot in order to provide longer inactive time period between transmissions. Whether a sub-frame is to be transmitted at the beginning or the end of the super slot is determined according to a pseudorandom sequence or any other predefined sequence.

Figure 6:
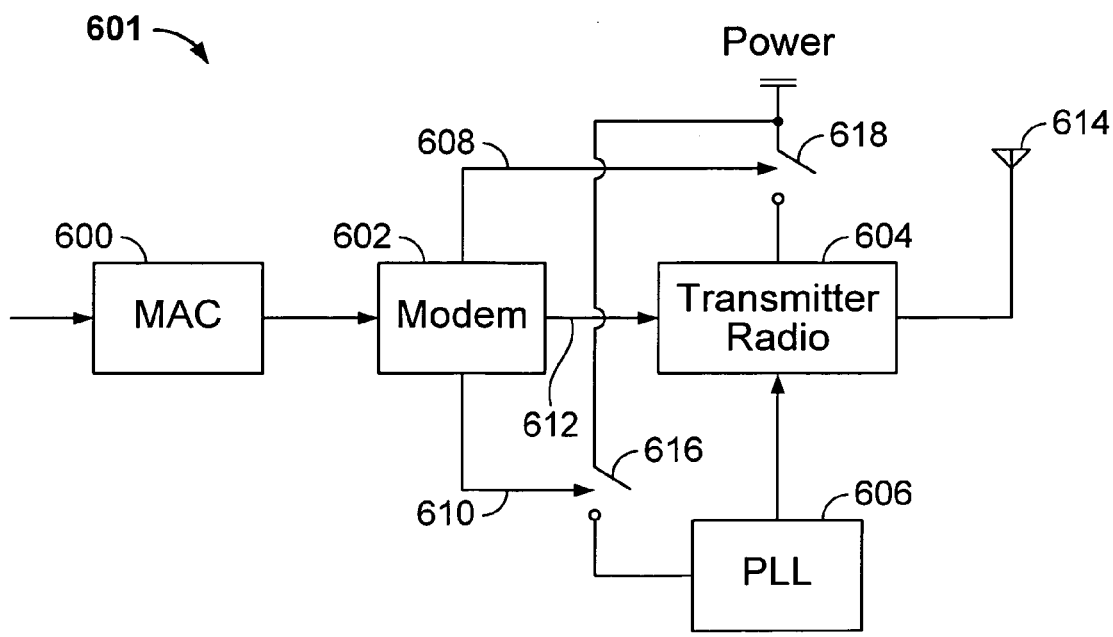
FIG. 6 is a block diagram illustrating a portion of an ultra wideband transmitter according to some embodiments.

FIG. 6 is a block diagram illustrating a portion of an ultra wideband transmitter according to some embodiments. In this example, input data to transmitter 601 is sent to a media access controller (MAC) 600 and then encoded and modulated by a modem 602. The modulated signal 612 is sent to transmitter radio 604 and transmitted via antenna 614. Assuming that the transmission scheme is determined a priori, the transmission sequence of the modulated data is controlled by modem 602. After a sub-frame is transmitted, modem 602 generates control signals such as 608 and 610, which selectively disable and enable transmitter components depending on the length of the inactive time period and the switching time thresholds required for the components to deactivate, reactivate and settle. For example, if the inactive time period is greater than the switching time threshold required for phase locked loop (PLL) 606, then control signal 610 will deactivate PLL 606 during this period by means such as switching off switch 616 to disconnect power to the PLL or sending a digital disable signal to the PLL. If, however, the inactive time period is less than the threshold required for turning off transmitter radio 604, control signal 608 will keep the transmitter radio activated, thus allowing transmitter radio 604 to continue its operations.

Figure 7:
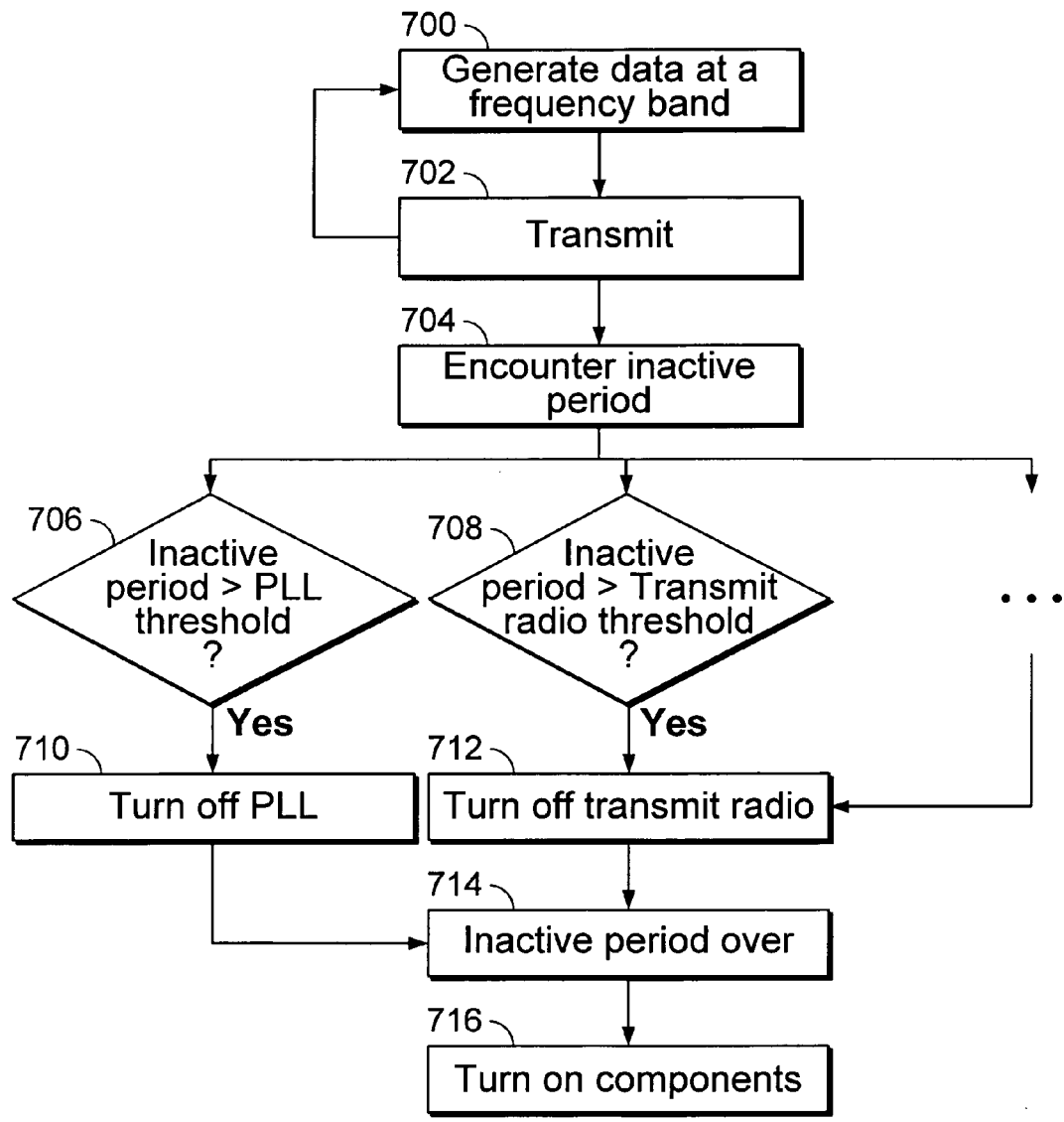
FIG. 7 is a flowchart illustrating the operations of transmitter 601 shown in FIG. 6.

FIG. 7 is a flowchart illustrating the operations of transmitter 601 shown in FIG. 6. In this example, data is generated for a frequency band (700) and transmitted (702). An inactive period is encountered in the transmission sequence (704). The length of the inactive period is compared with various setting time thresholds, including the threshold for the PLL (706), the transmit radio (708) or any other appropriate components. If the inactive period is greater than the threshold, the corresponding component is then disabled (710 and 712); otherwise, the component remains active. Once the inactive period is over, the components that were switched off are turned on again (716).

Figure 8:
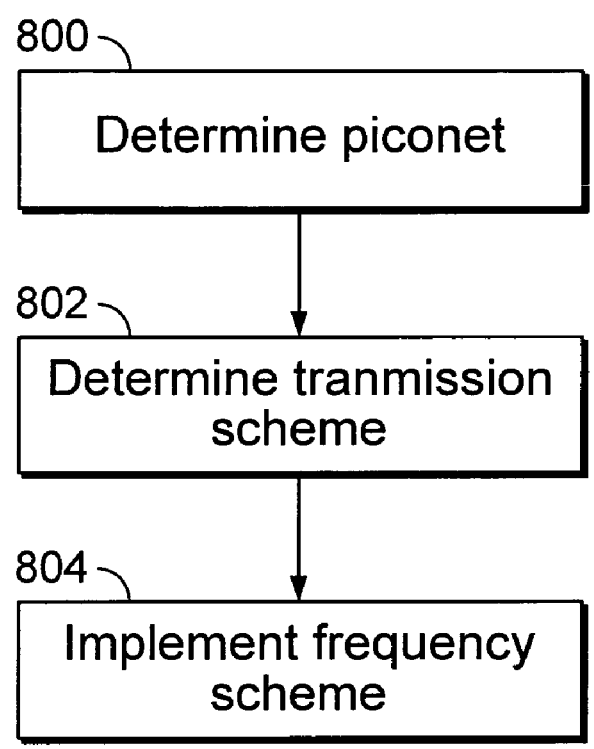
FIG. 8 is a flowchart illustrating the operations of an OFDM transmitter embodiment.

FIG. 8 is a flowchart illustrating the operations of an OFDM transmitter embodiment. In this example, the transmitter operates in an environment with multiple piconets. It is preferable for adjacent piconets to adopt different transmission schemes in order to reduce interference. The piconet in which the transmitter operates is determined (800). An appropriate transmission scheme is then determined (802). In some embodiments, a lookup table that stores a mapping of piconets to frequency scheme is used to lookup the corresponding frequency scheme for this piconet. In some embodiments, the frequency schemes used by neighboring piconets are detected and a frequency scheme that would not substantially interfere with the neighboring piconets is selected. The appropriate frequency scheme is then implemented (804).

A technique for transmitting information in a communication system has been disclosed. Although OFDM systems that include three frequency bands are discussed in detail for purposes of example, the technique is also applicable to OFDM systems with different number of frequency bands. The technique is applicable to both frequency hopping and non-frequency hopping systems.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of transmitting information, comprising:
grouping a plurality of active time slots into a plurality of sub-frames, wherein each of the sub-frames includes a plurality of contiguous active time slots;
transmitting data during a first one of the plurality of sub-frames;
waiting during an inactive period; and
transmitting data during a second one of the plurality of sub-frames.

2. A method of transmitting information as recited in claim 1, wherein an active time slot is a period of time used to transmit a data package.

3. A method of transmitting information as recited in claim 1, wherein an active time slot is a period of time used to transmit a data package during which the data package is transmitted in a frequency band that is substantially non-overlapping with respect to an adjacent frequency band used to transmit another data package during an adjacent active time slot.

4. A method of transmitting information as recited in claim 1, wherein the inactive period includes a plurality of contiguous inactive time slots.

5. A method of transmitting information as recited in claim 1, further comprising grouping one or more sub-frames and one or more inactive periods into a super slot.

6. A method of transmitting information as recited in claim 5, wherein said one or more sub-frames and said one or more inactive periods are arranged subject to a constraint.

7. A method of transmitting information as recited in claim 5, wherein said one or more sub-frames and said one or more inactive periods are arranged according to a fixed pattern.

8. A method of transmitting information as recited in claim 5, wherein said one or more sub-frames and said one or more inactive periods are arranged according to pseudo random sequence.

9. A method of transmitting information as recited in claim 5, wherein said one or more sub-frames in the super slot are contiguous and said one or more inactive periods in the super slot are contiguous.

10. A method of transmitting information as recited in claim 1, further comprising deactivating a transmitter circuit component during the inactive period.

11. A method of transmitting information as recited in claim 10, further comprising comparing a switching time threshold of the component with the inactive period.

12. A method of transmitting information as recited in claim 1, wherein the data transmitted includes an Orthogonal Frequency Division Multiplexing (OFDM) modulated signal.

13. A method of transmitting information as recited in claim 1, wherein the communication system includes an Ultra-Wide Band (UWB) system.

14. A method of transmitting information as recited in claim 1, wherein an active time slot is approximately 312.5 nanoseconds.

15. A system configured to transmit information, comprising:
   a controller configured to group a plurality of active time slots into a plurality of sub-frames, wherein each of the sub-frames includes a plurality of contiguous active time slots; and
   a transmitter coupled to the controller, configured to:
      transmit data during a first one of the plurality of sub-frames;
      wait during an inactive period; and
      transmit data during a second one of the plurality of sub-frames.

16. A computer program product for controlling information transmitted in a communication system, the computer program product being embodied in a computer readable medium and comprising computer instructions for:
   grouping a plurality of active time slots into a plurality of sub-frames, wherein each of the sub-frames includes a plurality of contiguous active time slots;
   transmitting data during a first one of the plurality of sub-frames;
   waiting during an inactive period; and
   transmitting data during a second one of the plurality of sub-frames.

* * * * *